(12) United States Patent
Payne et al.

(10) Patent No.: US 10,049,115 B1
(45) Date of Patent: Aug. 14, 2018

(54) SYSTEMS AND METHODS FOR PERFORMING INCREMENTAL DATABASE BACKUPS

(71) Applicant: Veritas Technologies LLC, Mountain View, CA (US)

(72) Inventors: Michael Payne, Archer, FL (US); Steven Devos, Mercer Island, WA (US)

(73) Assignee: Veritas Technologies LLC, Mountain View, CA (US)

( * ) Notice: Subject to any disclaimer, the term of this patent is extended or adjusted under 35 U.S.C. 154(b) by 646 days.

(21) Appl. No.: 13/835,472

(22) Filed: Mar. 15, 2013

(51) Int. Cl.
*G06F 17/30* (2006.01)
(52) U.S. Cl.
CPC .............................. *G06F 17/30129* (2013.01)
(58) Field of Classification Search
CPC ...................... G06F 11/1451; G06F 17/30067
USPC ......................................................... 707/646
See application file for complete search history.

(56) References Cited

U.S. PATENT DOCUMENTS

| 7,366,803 B1 * | 4/2008 | Gaither | H04L 12/433 370/363 |
| 8,099,391 B1 * | 1/2012 | Monckton | 707/647 |
| 2007/0027937 A1 * | 2/2007 | McGrattan et al. | 707/204 |
| 2007/0220222 A1 * | 9/2007 | Boldt et al. | 711/162 |
| 2008/0025344 A1 * | 1/2008 | Biederman et al. | 370/498 |

OTHER PUBLICATIONS

Shaun Cooley; Systems and Methods for Performing Selective Deep Packet Inspection; U.S. Appl. No. 13/615,444, filed Sep. 13, 2012.

* cited by examiner

*Primary Examiner* — Boris Gorney
*Assistant Examiner* — Allen Lin
(74) *Attorney, Agent, or Firm* — FisherBroyles LLP

(57) ABSTRACT

A computer-implemented method for performing incremental database backups may include (1) identifying a request to perform a block-level incremental backup of a database, the block-level incremental backup including data that has changed within the database since a previous block-level incremental backup of the database, (2) requesting, in response to the request, a differential backup stream from a database server of the database, (3) creating an incremental backup stream from the differential backup stream at least in part by removing at least one database block from the differential backup stream that has not changed since the previous block-level incremental backup and (4) forwarding the incremental backup stream to a backup location to create the block-level incremental backup. Various other methods, systems, and computer-readable media are also disclosed.

20 Claims, 6 Drawing Sheets

SYSTEMS AND METHODS FOR PERFORMING INCREMENTAL DATABASE BACKUPS

BACKGROUND

In the digital age, organizations increasingly rely on digitally-stored data. To protect against data loss, an organization may use a backup system to back up important data. Traditional backup systems may periodically create a full backup by capturing all files of a volume. Between full backups, a backup system may capture intermediate backups, referred to as incremental backups, which include data that has changed since the previous incremental or full backup. An incremental backup may be orders of magnitude smaller and faster than a full backup.

Some traditional database systems may provide support for backing up databases with full and differential backups. Unfortunately, these traditional database systems may not always provide support for incremental backups of databases. Conventional approaches for incremental backups in such cases may include taking snapshots of a database file and performing incremental backups from the snapshots. Unfortunately, the use of snapshots may be cumbersome, resource-intensive, and/or otherwise unsuited for some configurations and/or infrastructures.

Accordingly, the instant disclosure identifies and addresses a need for additional and improved systems and methods for performing incremental database backups.

SUMMARY

As will be described in greater detail below, the instant disclosure generally relates to systems and methods for performing incremental database backups by removing database blocks from differential backup streams of databases to create incremental backup streams of the databases.

In one example, a computer-implemented method for performing incremental database backups may include (1) identifying a request to perform a block-level incremental backup of a database, the block-level incremental backup including data that has changed within the database since a previous block-level incremental backup of the database, (2) requesting, in response to the request, a differential backup stream from a database server of the database, (3) creating an incremental backup stream from the differential backup stream at least in part by removing at least one database block from the differential backup stream that has not changed since the previous block-level incremental backup and (4) forwarding the incremental backup stream to a backup location to create the block-level incremental backup.

In some examples, removing the database block from the differential backup stream may include inspecting content of the database block to determine that the database block has not changed since the previous block-level incremental backup.

In some examples, removing the database block from the differential backup stream may include inspecting a control block within the differential backup stream to determine that the database block has not changed since the previous block-level incremental backup.

In some examples, removing the database block from the differential backup stream may include (1) inspecting the database block to identify a unique identifier of the database block, (2) inspecting the database block to identify an ordered identifier of the database block that may indicate a place within a sequence at which the database block was changed and (3) determining that a past ordered identifier of the database block may match the ordered identifier of the database block.

In some examples, determining that the past ordered identifier of the database block may match the ordered identifier of the database block may include (1) identifying a previous differential backup stream of the database, (2) inspecting the database block within the previous differential backup stream to identify the unique identifier of the database block and the past ordered identifier of the database block, (3) storing the unique identifier of the database block in association with the past ordered identifier of the database block in a log and (4) after identifying the database block within the differential backup stream, looking up the unique identifier of the database block in the log to retrieve the past ordered identifier.

In some examples, forwarding the incremental backup stream to the backup location may include forwarding the incremental backup stream from the database server to a backup server.

In one embodiment, a system for implementing the above-described method may include (1) an identification module programmed to identify a request to perform a block-level incremental backup of a database, the block-level incremental backup including data that has changed within the database since a previous block-level incremental backup of the database, (2) a requesting module programmed to request, in response to the request, a differential backup stream from a database server of the database, (3) a creation module programmed to create an incremental backup stream from the differential backup stream at least in part by removing at least one database block from the differential backup stream that has not changed since the previous block-level incremental backup, (4) a forwarding module programmed to forward the incremental backup stream to a backup location to create the block-level incremental backup and (5) at least one processor configured to execute the identification module, the requesting module, the creation module and the forwarding module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a request to perform a block-level incremental backup of a database, the block-level incremental backup including data that has changed within the database since a previous block-level incremental backup of the database, (2) request, in response to the request, a differential backup stream from a database server of the database, (3) create an incremental backup stream from the differential backup stream at least in part by removing at least one database block from the differential backup stream that has not changed since the previous block-level incremental backup and (4) forward the incremental backup stream to a backup location to create the block-level incremental backup.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
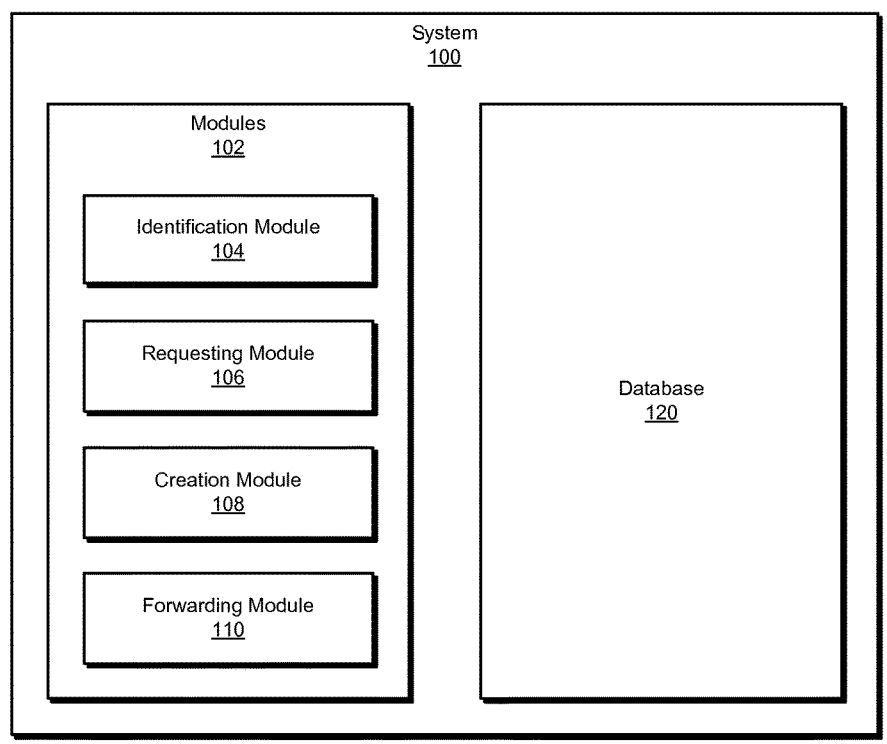
FIG. 1 is a block diagram of an exemplary system for performing incremental database backups.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for performing incremental database backups. As will be explained in greater detail below, by removing database blocks from differential backup streams of databases to create incremental backup streams of the databases, the systems and methods described herein may efficiently generate incremental backup streams where database systems lack the native capability to do so and without requiring the use of snapshots. In some examples, by converting differential backup streams to incremental backup streams before forwarding the incremental backup streams to media severs, the systems and methods described herein may save network resources. Furthermore, in some examples, by inspecting each block of differential backup streams one time and in order to remove unneeded database blocks, these systems and methods may efficiently convert the differential backup streams to incremental backup streams and/or avoid intermediate processing steps traditionally used for creating incremental backups.

Figure 2:
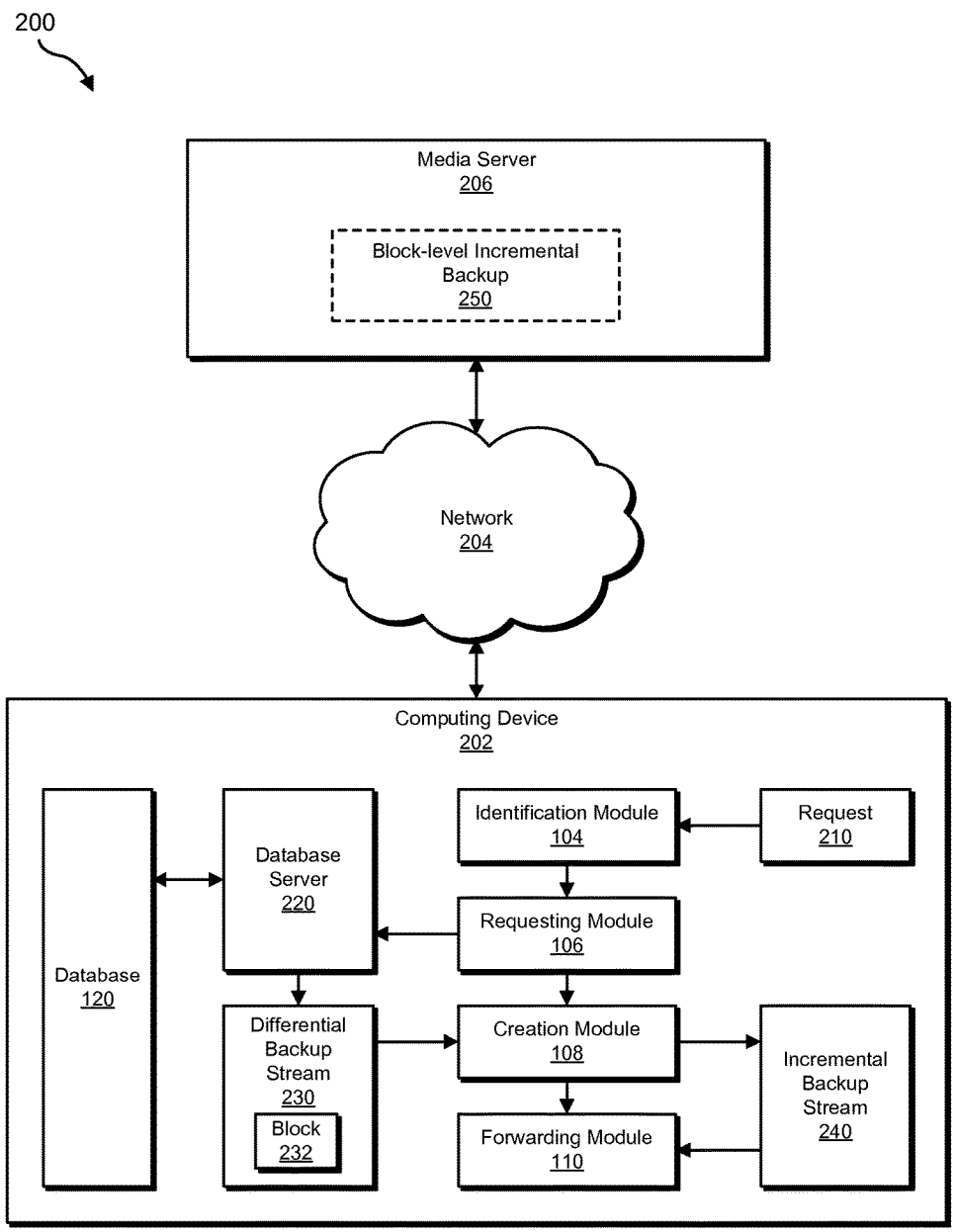
FIG. 2 is a block diagram of an exemplary system for performing incremental database backups.

The following will provide, with reference to FIGS. 1-2, detailed descriptions of exemplary systems for performing incremental database backups. Detailed descriptions of corresponding computer-implemented methods will also be provided in connection with FIG. 3. Detailed descriptions of exemplary data streams will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for performing incremental database backups. As illustrated in this figure, exemplary system 100 may include one or more modules 102 for performing one or more tasks. For example, and as will be explained in greater detail below, exemplary system 100 may also include an identification module 104 programmed to identify a request to perform a block-level incremental backup of a database, the block-level incremental backup including data that has changed within the database since a previous block-level incremental backup of the database. Exemplary system 100 may additionally include a requesting module 106 programmed to request, in response to the request, a differential backup stream from a database server of the database. Exemplary system 100 may also include a creation module 108 programmed to create an incremental backup stream from the differential backup stream at least in part by removing at least one database block from the differential backup stream that has not changed since the previous block-level incremental backup. Exemplary system 100 may additionally include a forwarding module 110 programmed to forward the incremental backup stream to a backup location to create the block-level incremental backup. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or media server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store any data that may be subject to backup.

Database 120 may represent portions of a single database or computing device or a plurality of databases or computing devices. For example, database 120 may represent a portion of computing device 202 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing device 202 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a media server 206 via a network 204. Computing device 202 may be programmed with one or more of modules 102 and/or may store all or a portion of the data in database 120. Additionally or alternatively, media server 206 may be programmed with one or more of modules 102.

In one embodiment, one or more of modules 102 from FIG. 1 may, when executed by at least one processor of computing device 202 and/or media server 206, facilitate computing device 202 and/or media server 206 in performing incremental database backups. For example, and as will be described in greater detail below, one or more of modules 102 may cause computing device 202 and/or media server 206 to perform incremental database backups. For example, and as will be described in greater detail below, identification module 104 may be programmed to identify a request 210 to perform a block-level incremental backup 250 of database 120, block-level incremental backup 250 including data that has changed within database 120 since a previous block-level incremental backup of database 120. Requesting module 106 may be programmed to request 210, in response to request 210, a differential backup stream 230 from database server 220 of database 120. Creation module 108 may be programmed to create an incremental backup stream 240 from differential backup stream 230 at least in part by removing at least one database block 232 from differential backup stream 230 that has not changed since the previous block-level incremental backup. Forwarding module 110 may be programmed to forward incremental backup stream 240 to media server 206 to create block-level incremental backup 250.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device. In some examples, computing device 202 may represent a database server (e.g., a computing device that hosts a database server).

Media server 206 generally represents any type or form of computing device that is capable of facilitating a backup. Examples of media server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and media server 206.

Figure 3:
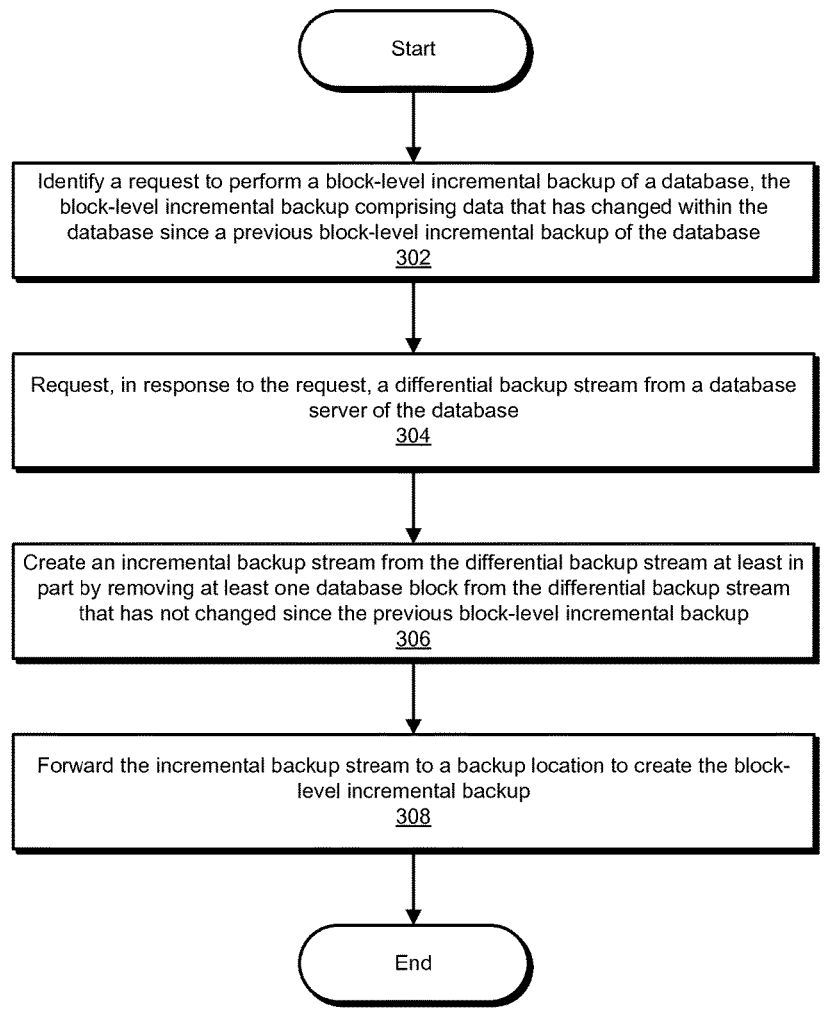
FIG. 3 is a flow diagram of an exemplary method for performing incremental database backups.

FIG. 3 is a flow diagram of an exemplary computer-implemented method 300 for performing incremental database backups. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a request to perform a block-level incremental backup of a database, the block-level incremental backup including data that has changed within the database since a previous block-level incremental backup of the database. For example, at step 302 identification module 104 may, as part of computing device 202 in FIG. 2, identify request 210 to perform block-level incremental backup 250 of database 120, block-level incremental backup 250 including data that has changed within database 120 since a previous block-level incremental backup of database 120.

As used herein, the term "backup" may refer to any procedure to backup, duplicate, and/or protect data and/or the results of any such procedure. Accordingly, the phrase "full backup" may refer to any backup directed to the entirety of a backup source. The phrase "differential backup" may refer to any backup capturing changes to a backup source since a full backup (e.g., a most recent full backup). The phrase "incremental backup" may refer to any backup capturing changes to a backup source since a full, differential, and/or incremental backup (e.g., a most recent full, differential, and/or incremental backup). Accordingly, the phrase "block-level incremental backup" may refer to any backup capturing changes to one or more blocks of a backup source on an incremental basis.

As used herein, the phrase "database block" and the term "block" generally may refer to any unit of database data. In some examples, the phrase "database block" may refer to a fixed-size unit of database data. In some examples, the phrase "database block" may refer to a database page and/or extent of pages. For example, the phrase "database block" may refer to an 8 kilobyte MICROSOFT SQL SERVER database page. In some examples, a database block may include primary data as well as metadata relating to the database block (e.g., stored within a page header).

As used herein, the term "database" may refer to any system and/or data structure for storing, organizing, and/or associating data. For example, a database may include one or more database files that store one or more relational database tables. In some examples, the term "database" may refer to a selection of data within a database system (e.g., selected tables within a database). As used herein, the phrase "database server" may refer to any system (e.g., a software system and/or a computing device hosting such a software system) for managing and/or providing access to one or more databases. In some examples, the phrase "database server" may refer to a system for managing databases that is capable of providing a stream of database blocks (including, e.g., a differential backup of a database) with unique identifiers for the database blocks and/or change stamps for the database blocks. For example, the database server may include MICROSOFT SQL SERVER. In some examples, the phrase "database server" may refer to a database system without a native capacity to stream incremental backups. For example, the database server may include MICROSOFT SQL SERVER 2000.

Identification module 104 may identify the request to perform the block-level incremental backup in any suitable manner. For example, identification module 104 may identify a backup policy that specifies an incremental backup of the database. Additionally or alternatively, identification module 104 may receive a message from a backup system requesting an incremental backup of the database. In some examples, identification module 104 may operate as a part of an agent operating on a device with the database server.

Returning to FIG. 3, at step 304 one or more of the systems described herein may request, in response to the request, a differential backup stream from a database server of the database. For example, at step 304 requesting module 106 may, as part of computing device 202 in FIG. 2, request, in response to request 210, differential backup stream 230 from database server 220 of database 120.

As used herein, the term "stream" may refer to any sequence of data available for serial observation, inspection, processing, and/or recording. In some examples, the term "stream" may refer to a stream of database blocks. In some examples, the term "stream" may refer to a stream formatted for backup media. For example, the differential backup stream may include a MICROSOFT TAPE FORMAT stream.

Requesting module 106 may request the differential backup stream in any suitable manner. For example, requesting module 106 may execute a script within the database server to initiate the differential backup stream.

At step 306 one or more of the systems described herein may create an incremental backup stream from the differential backup stream at least in part by removing at least one database block from the differential backup stream that has not changed since the previous block-level incremental backup. For example, at step 306 creation module 108 may, as part of computing device 202 in FIG. 2, create an incremental backup stream 240 from differential backup stream 230 at least in part by removing at least one database block 232 from differential backup stream 230 that has not changed since the previous block-level incremental backup.

As used herein, the phrase "previous block-level incremental backup" may refer to any backup within a set of backups at an incremental level. For example, the block-level incremental backup to be performed may be the first incremental backup of the database since a full backup. Accordingly, the previous block-level incremental backup may include the full backup (e.g., because the full backup is the previous backup in an incremental backup series).

Creation module 108 may remove the database block from the differential backup stream in any of a variety of contexts. In some examples, creation module 108 may determine that the database block has not changed since the previous block-level incremental backup by inspecting content of the database block to determine that the database block has not changed since the previous block-level incremental backup. For example, as will be explained in greater detail below, in some examples creation module 108 may identify metadata within the database block that indicates that the database block has changed since the previous block-level incremental backup.

In some examples, creation module 108 may remove the database block from the differential backup stream after determining that the database block has not changed since the previous block-level incremental backup by inspecting a control block within the differential backup stream to determine that the database block has not changed since the previous block-level incremental backup. As used herein, the phrase "control block" may refer to any database block that stores metadata for the database. For example, the phrase "control block" may refer to a MICROSOFT SQL SERVER page with a page type value of 16, identifying extents within the database that have changed since a most recent backup. In some examples, creation module 108 may also identify a MICROSOFT SQL SERVER page with a page type value of 9, identifying a global allocation map that indicates which extents within the database are allocated.

As mentioned earlier, in some examples creation module 108 may identify metadata within the database block that indicates that the database block has changed since the previous block-level incremental backup. For example, creation module 108 may (1) inspect the database block to identify a unique identifier of the database block, (2) inspect the database block to identify an ordered identifier of the database block that may indicate a place within a sequence at which the database block was changed and (3) determine that a past ordered identifier of the database block may match the ordered identifier of the database block. The unique identifier of the block may include any suitable identifier for distinguishing the database blocks from other blocks in the database. For example, the unique identifier may include a location of the database block within the database. For example, the unique identifier may include a file number of the database block and a position of the database block within the file. In some examples, creation module 108 may identify the unique identifier of the database block within a header of the database block. The ordered identifier of the database block may include any suitable information capable of identifying in what relative sequence the most recent change to the database block occurred and the most recent backup of the database occurred. For example, the ordered identifier may include a timestamp identifying when the database block was last modified within the database. Additionally or alternatively, the ordered identifier may include a log sequence number indicating a log record describing a most recent change of the database block. In this example, the log sequence number may include a value ordered relative to other log sequence numbers according to the order of changes to which the log sequence numbers refer.

In some examples, creation module 108 may determine that the past ordered identifier of the database block matches the ordered identifier of the database block by (1) identifying a previous differential backup stream of the database, (2) inspecting the database block within the previous differential backup stream to identify the unique identifier of the database block and the past ordered identifier of the database block, (3) storing the unique identifier of the database block in association with the past ordered identifier of the database block in a log and (4) after identifying the database block within the differential backup stream, looking up the unique identifier of the database block in the log to retrieve the past ordered identifier.

For example, creation module 108 may have previously handled the previous differential backup stream and recorded the unique identifier and the past ordered identifier of the same database block. Later, when inspecting the differential backup stream, creation module 108 may retrieve the unique identifier from the database block, look up the unique identifier to find the past ordered identifier, and compare the past ordered identifier with the ordered identifier and determine that they match. Creation module 108 may then, based on the match, determine that the database block did not change since the previous differential backup (and, therefore, since a previous incremental backup that the systems and methods described herein may have generated from the previous differential backup).

Creation module 108 may process the differential backup stream in any suitable manner. In some examples, creation module 108 may process the differential backup stream without first saving the stream to a random-access device. Accordingly creation module 108 may only have one opportunity to inspect each database block in the order that each database block appears within the differential backup stream. For example, creation module 108 may inspect each database block of the differential backup stream in order and determine, in order, whether to remove each database block of the differential backup stream.

Figure 4:
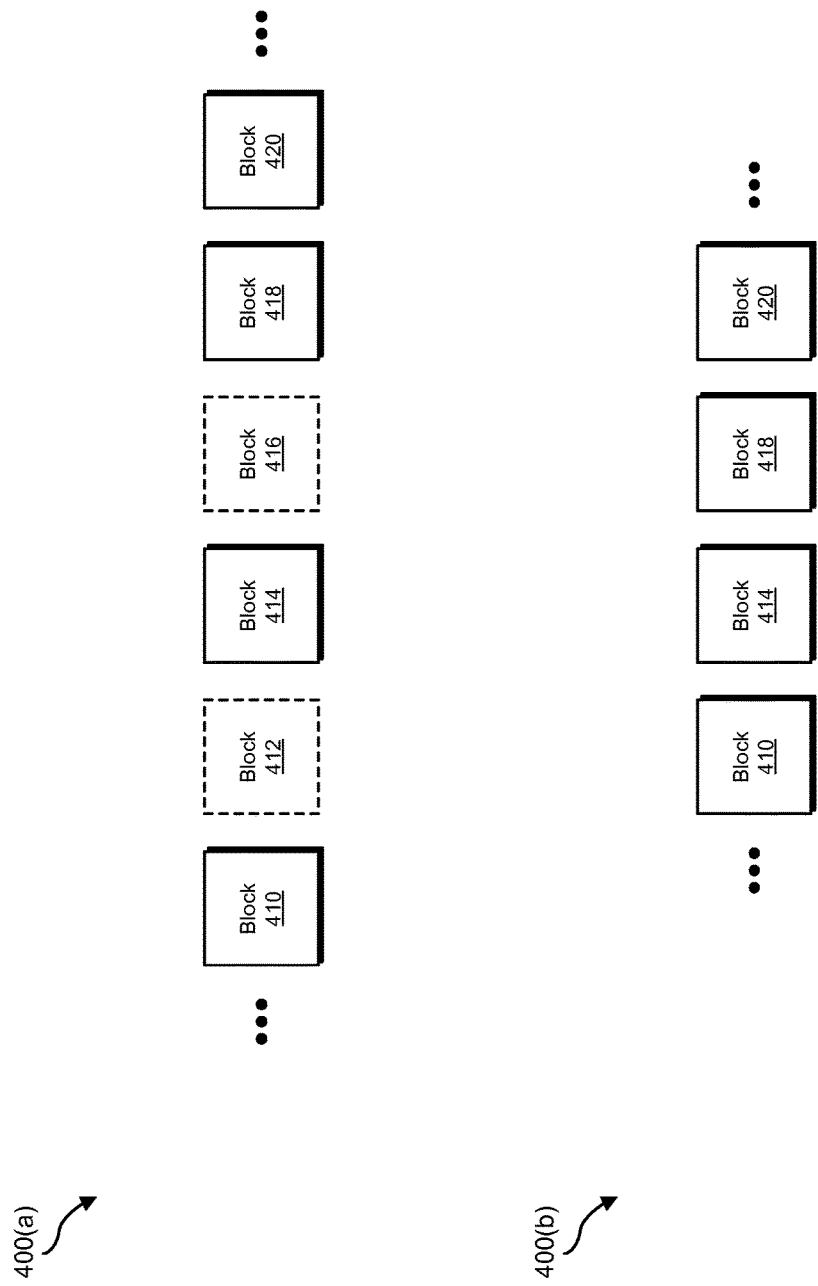
FIG. 4 is a diagram of exemplary data streams.

FIG. 4 is a block diagram of exemplary streams 400(a) and 400(b). As shown in FIG. 4, stream 400(a) may include blocks 410, 412, 414, 416, 418, and 420. In some examples, stream 400(a) may represent a differential backup stream of a database. Using FIG. 4 as an example, at step 306 creation module 108 may determine that block 412 has not changed since a previous backup of the database. Likewise, creation module 108 may determine that block 416 has not changed since a previous backup of the database. Accordingly, creation module 108 may remove blocks 412 and 416 from stream 400(a), thereby creating stream 400(b) with blocks 410, 414, 418, and 420. In this example, stream 400(b) may represent an incremental backup stream of the database. In some examples, creation module 108 may inspect the blocks of stream 400(a) one time each, in sequence, to determine which blocks to remove from stream 400(a).

Returning to FIG. 3, at step 308 one or more of the systems described herein may forward the incremental backup stream to a backup location to create the block-level incremental backup. For example, at step 308 forwarding module 110 may, as part of computing device 202 in FIG. 2, forward incremental backup stream 240 to a backup location (e.g., media server 206) to create block-level incremental backup 250.

Forwarding module 110 may forward the incremental backup stream to the backup location in any suitable context. In some examples, forwarding module 110 may forward the incremental backup stream from the database server to a backup server. For example, forwarding module 110 may operate from within an agent situated at the database server. In this example, because the systems described herein may have reduced the differential backup stream to the incremental backup stream before forwarding the incremental backup stream to the backup server, these systems may reduce the use of network resources. Furthermore, by reducing the differential backup stream to the incremental backup stream before forwarding the incremental backup stream to the backup server, these systems may present a backup type expected and/or immediately consumable by the backup server. As used herein, the phrase "backup server" may refer to any device capable of facilitating a backup. For example, the phrase "backup server" may refer to a media server. In some examples, the backup server may write the incremental backup stream directly to backup media.

In some examples, the systems and methods described herein may also restore the block-level incremental backup to the database. For example, a restoring module may restore the block-level incremental backup to the database while the database server is offline. In this example, the restoring module may write each database block within the block-level incremental backup to the location of the database block (e.g., as indicated within a header of the database block) within the database directly.

As explained above in connection with method 300 in FIG. 3, the systems described herein may create an incremental backup of a database that lacks a native incremental backup capability, without using snapshots, by initiating a differential backup stream of the database, analyzing the database blocks of the differential backup stream (e.g., in order) to extract metadata indicating which database blocks have not changed since a previous backup (e.g., incremental, differential, or full), and remove those database blocks which have not change from the stream, resulting in an incremental backup stream.

Figure 5:
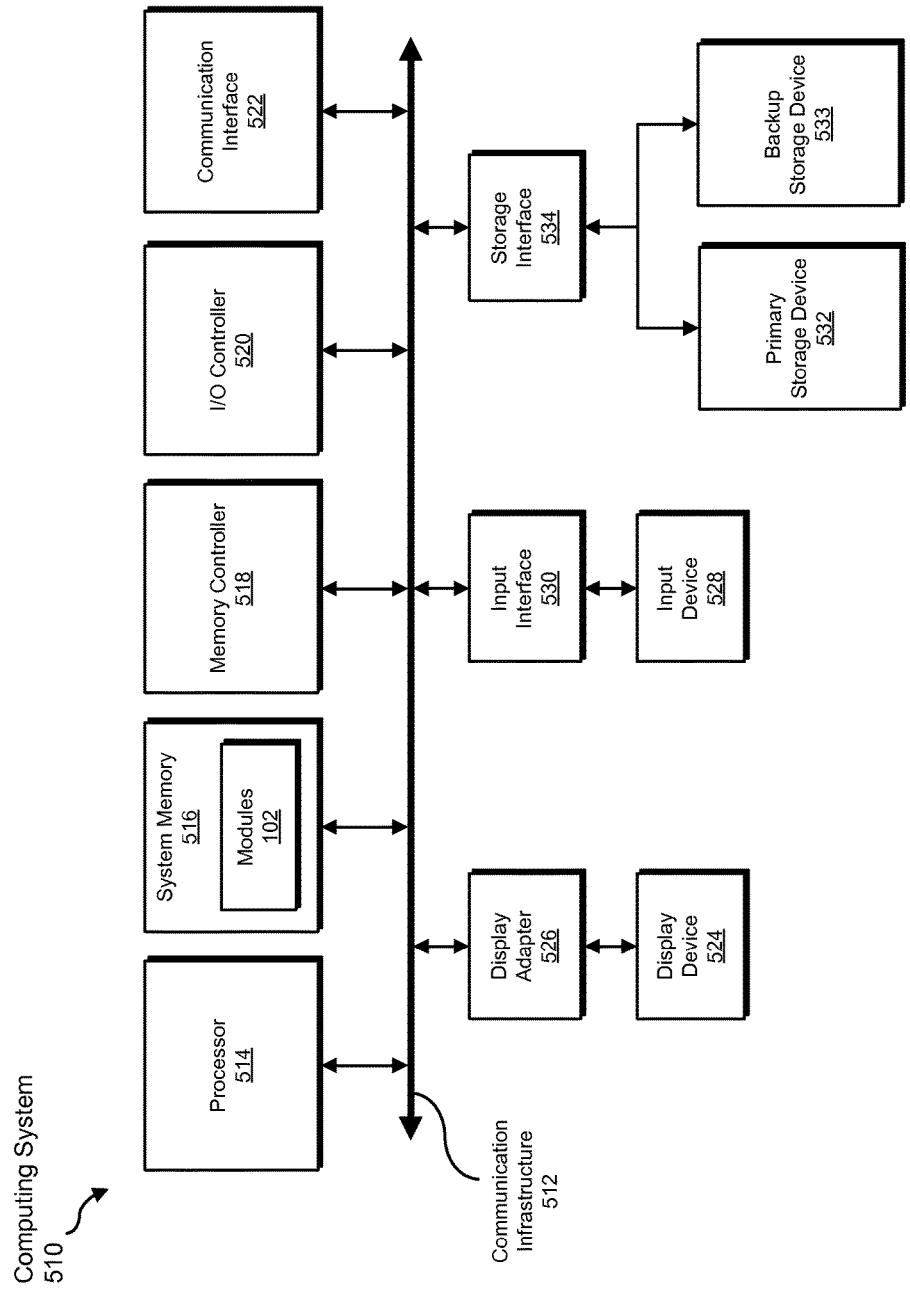
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, requesting, creating, inspecting, determining, storing, looking up, forwarding, and restoring steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
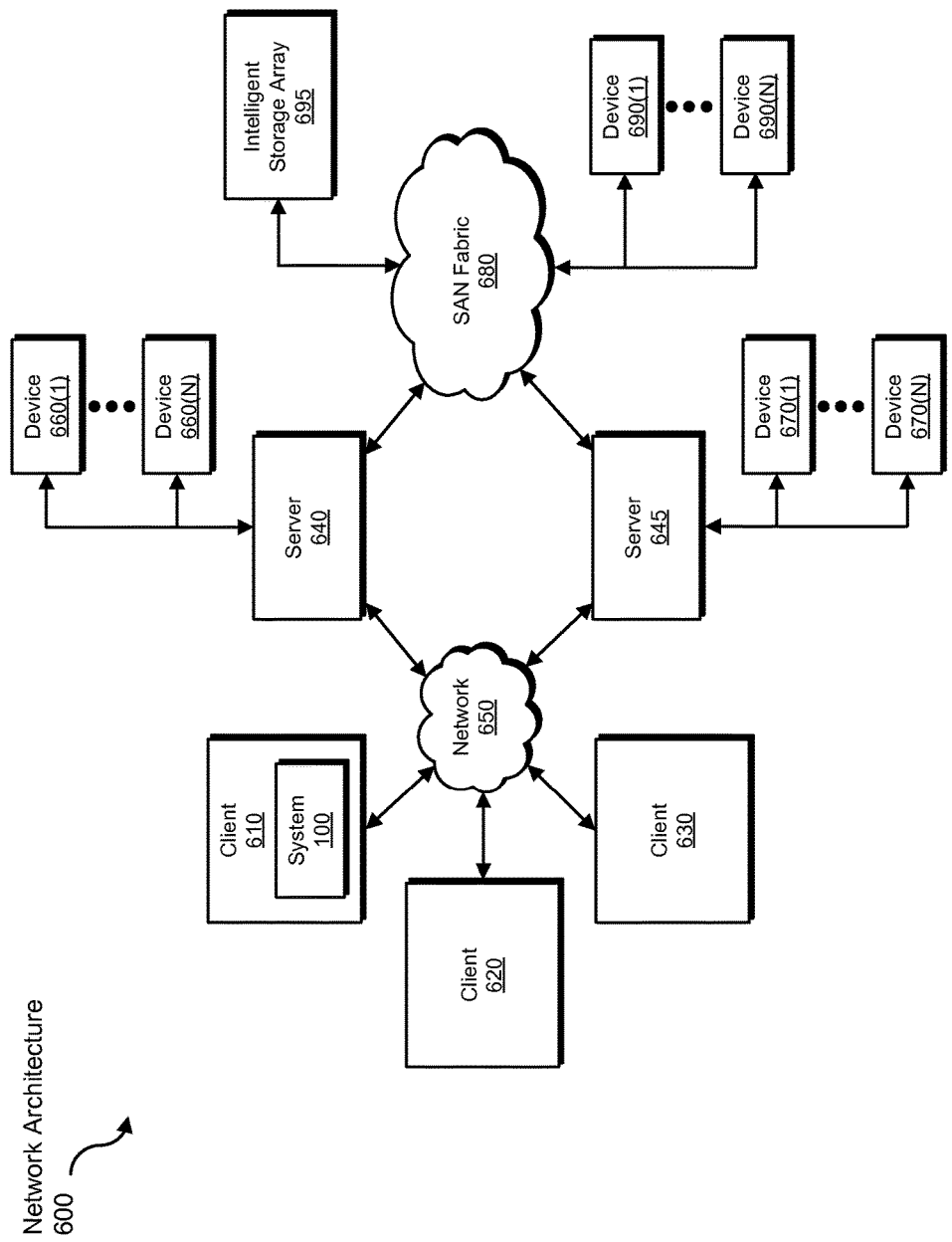
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, requesting, creating, inspecting, determining, storing, looking up, forwarding, and restoring steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for performing incremental database backups.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a differential backup stream of a database to be transformed, transform the differential backup stream, output a result of the transformation to an incremental backup stream, use the result of the transformation to create an incremental backup of the database, and store the result of the transformation to a backup storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing incremental database backups, at least a portion of the method being performed by a computing device comprising at least one processor, the method comprising:

identifying a request to perform a block-level incremental backup of a database, the block-level incremental backup comprising data that has changed within the database during a first span of time beginning at a previous block-level incremental backup of the database and omitting data that has not changed within the database during the first span of time beginning at the previous block-level incremental backup of the database;

issuing an additional request, in response to the request, for a differential backup stream from a database server of the database, the differential backup stream comprising data that has changed within the database during an overall span of time beginning at a most recent full backup, the most recent full backup having occurred prior to the previous block-level incremental backup, and omitting data that has not changed within the database during the overall span of time beginning at the most recent full backup;

creating an incremental backup stream from the differential backup stream that comprises data that has changed during the overall span of time at least in part by removing at least one database block from the differential backup stream that has changed during the overall span of time but that has not changed during the first span of time;

forwarding the incremental backup stream to a backup location to create the block-level incremental backup.

2. The computer-implemented method of claim 1, wherein removing the database block from the differential backup stream comprises inspecting content of the database block to determine that the database block has not changed since the previous block-level incremental backup.

3. The computer-implemented method of claim 1, wherein removing the database block from the differential backup stream comprises inspecting a control block within the differential backup stream to determine that the database block has not changed since the previous block-level incremental backup.

4. The computer-implemented method of claim 1, wherein removing the database block from the differential backup stream comprises:

inspecting the database block to identify a unique identifier of the database block;

inspecting the database block to identify an ordered identifier of the database block that indicates a place within a sequence at which the database block was changed;

determining that a past ordered identifier of the database block matches the ordered identifier of the database block.

5. The computer-implemented method of claim 4, wherein determining that the past ordered identifier of the database block matches the ordered identifier of the database block comprises:

identifying a previous differential backup stream of the database;

inspecting the database block within the previous differential backup stream to identify the unique identifier of the database block and the past ordered identifier of the database block;

storing the unique identifier of the database block in association with the past ordered identifier of the database block in a log;

after identifying the database block within the differential backup stream, looking up the unique identifier of the database block in the log to retrieve the past ordered identifier.

6. The computer-implemented method of claim 1, wherein forwarding the incremental backup stream to the backup location comprises forwarding the incremental backup stream from the database server to a backup server.

7. The computer-implemented method of claim 1, wherein creating the incremental backup stream from the differential backup stream comprises inspecting each database block of the differential backup stream in order and determining, in order, whether to remove each database block of the differential backup stream.

8. The computer-implemented method of claim 1, further comprising restoring the block-level incremental backup to the database.

9. A system for performing incremental database backups, the system comprising:
- an identification module programmed to identify a request to perform a block-level incremental backup of a database, the block-level incremental backup comprising data that has changed within the database during a first span of time beginning at a previous block-level incremental backup of the database and omitting data that has not changed within the database during the first span of time beginning at the previous block-level incremental backup of the database;
- a requesting module programmed to issue an additional request, in response to the request, for a differential backup stream from a database server of the database, the differential backup stream comprising data that has changed within the database during an overall span of time beginning at a most recent full backup, the most recent full backup having occurred prior to the previous block-level incremental backup, and omitting data that has not changed within the database during the overall span of time beginning at the most recent full backup;
- a creation module programmed to create an incremental backup stream from the differential backup stream that comprises data that has changed during the overall span of time at least in part by removing at least one database block from the differential backup stream that has changed during the overall span of time but that has not changed during the first span of time;
- a forwarding module programmed to forward the incremental backup stream to a backup location to create the block-level incremental backup;
- at least one processor configured to execute the identification module, the requesting module, the creation module, and the forwarding module.

10. The system of claim 9, wherein the creation module is programmed to remove the database block from the differential backup stream by inspecting content of the database block to determine that the database block has not changed since the previous block-level incremental backup.

11. The system of claim 9, wherein the creation module is programmed to remove the database block from the differential backup stream by inspecting a control block within the differential backup stream to determine that the database block has not changed since the previous block-level incremental backup.

12. The system of claim 9, wherein the creation module is programmed to remove the database block from the differential backup stream by:
- inspecting the database block to identify a unique identifier of the database block;
- inspecting the database block to identify an ordered identifier of the database block that indicates a place within a sequence at which the database block was changed;
- determining that a past ordered identifier of the database block matches the ordered identifier of the database block.

13. The system of claim 12, wherein the creation module is programmed to determine that the past ordered identifier of the database block matches the ordered identifier of the database block by:
- identifying a previous differential backup stream of the database;
- inspecting the database block within the previous differential backup stream to identify the unique identifier of the database block and the past ordered identifier of the database block;
- storing the unique identifier of the database block in association with the past ordered identifier of the database block in a log;
- after identifying the database block within the differential backup stream, looking up the unique identifier of the database block in the log to retrieve the past ordered identifier.

14. The system of claim 9, wherein the forwarding module is programmed to forward the incremental backup stream to the backup location by forwarding the incremental backup stream from the database server to a backup server.

15. The system of claim 9, wherein the creation module is programmed to create the incremental backup stream from the differential backup stream by inspecting each database block of the differential backup stream in order and determining, in order, whether to remove each database block of the differential backup stream.

16. The system of claim 9, further comprising a restoring module programmed to restore the block-level incremental backup to the database.

17. A non-transitory computer-readable-storage medium comprising one or more computer-readable instructions that, when executed by at least one processor of a computing device, cause the computing device to:
- identify a request to perform a block-level incremental backup of a database, the block-level incremental backup comprising data that has changed within the database during a first span of time beginning at a previous block-level incremental backup of the database and omitting data that has not changed within the database during the first span of time beginning at the previous block-level incremental backup of the database;
- issuing an additional request, in response to the request, for a differential backup stream from a database server of the database, the differential backup stream comprising data that has changed within the database during an overall span of time beginning at a most recent full backup, the most recent full backup having occurred prior to the previous block-level incremental backup, and omitting data that has not changed within the database during the overall span of time beginning at the most recent full backup;
- create an incremental backup stream from the differential backup stream that comprises data that has changed during the overall span of time at least in part by removing at least one database block from the differential backup stream that has changed during the overall span of time but that has not changed during the first span of time;
- forward the incremental backup stream to a backup location to create the block-level incremental backup.

18. The non-transitory computer-readable-storage medium of claim 17, wherein removing the database block from the differential backup stream comprises inspecting content of the database block to determine that the database block has not changed since the previous block-level incremental backup.

19. The non-transitory computer-readable-storage medium of claim 17, wherein removing the database block from the differential backup stream comprises inspecting a control block within the differential backup stream to determine that the database block has not changed since the previous block-level incremental backup.

20. The non-transitory computer-readable-storage medium of claim 17, wherein removing the database block from the differential backup stream comprises:
- inspecting the database block to identify a unique identifier of the database block;
- inspecting the database block to identify an ordered identifier of the database block that indicates a place within a sequence at which the database block was changed;
- determining that a past ordered identifier of the database block matches the ordered identifier of the database block.

* * * * *